US005965949A

United States Patent [19]

Fukuda et al.

[11] Patent Number: 5,965,949

[45] Date of Patent: Oct. 12, 1999

[54] ENGINE-DRIVEN GENERATOR

[75] Inventors: Masahiro Fukuda; Tohru Yoshioka; Tohru Nishikura; Masaru Sakamoto, all of Gunma-ken, Japan

[73] Assignee: Sawafuji Electric Co., Ltd., Tokyo, Japan

[21] Appl. No.: 09/012,711

[22] Filed: Jan. 23, 1998

[30] Foreign Application Priority Data

Jan. 24, 1997 [JP] Japan .................................... 9-010753

[51] Int. Cl.$^{6}$ ........................................................ H02P 9/04

[52] U.S. Cl. .............................. 290/1 A; 290/1 B; 322/1; 322/32; 74/16

[58] Field of Search ..................................... 290/1 A, 1 B; 74/16; 322/1, 32

[56] References Cited

U.S. PATENT DOCUMENTS

| | | | |
|---|---|---|---|
| 4,548,164 | 10/1985 | Ylonen et al. | 123/2 |
| 4,629,031 | 12/1986 | Kato et al. | 181/204 |
| 4,647,835 | 3/1987 | Fujikawa et al. | 322/1 |
| 5,310,017 | 5/1994 | Tobias | 180/291 |
| 5,376,877 | 12/1994 | Kern et al. | 322/32 |
| 5,697,249 | 12/1997 | Miguchi | 74/16 |

*Primary Examiner*—Elvin G. Enad
*Attorney, Agent, or Firm*—McGlew and Tuttle, P.C.

[57] ABSTRACT

An engine-driven generator incorporating an engine and a generator into a single unit, with the output shaft of the engine coaxially connected to the rotating shaft of the generator, via a frame structure formed by integrally combining two support members provided in parallel with the axial line of the output and rotating shafts with two handle members orthogonally intersecting the aforementioned axial line via upright members wherein base members are fixedly fitted between the support members below the engine and the generator in such a manner as to orthogonally intersecting the aforementioned support members; a generator mounting member, having a mounting hole in the axial direction, provided between a bulged portion integrally protruded on the lower part a rear bracket of the generator and a base member below the generator, and two engine mounting members provided between the engine and a base member below the engine are disposed at the apexes of a triangle, so that the engine and the generator are mounted on the frame structure via the three mounting members.

6 Claims, 5 Drawing Sheets

ENGINE-DRIVEN GENERATOR

BACKGROUND OF THE INVENTION AND RELATED ART STATEMENT

This invention relates generally to an engine-driven generator comprising an engine and generator, both incorporated into a single unit via a frame structure, and more particularly to an engine-driven generator involving a small number of component parts and having improved assembling efficiency.

FIG. 1 is a perspective view illustrating an example of a conventional type of engine-driven generator. FIG. 2 is an exploded perspective view illustrating the frame structure shown in FIG. 1. As shown in FIG. 1, the engine-driven generator of the conventional type has an engine 1, a generator 2 driven by the engine 1, and a control box 3 incorporating a voltage regulator for keeping the output voltage of the generator 2 at a constant level; all mounted together on a frame structure 4.

The frame structure 4 has a base frame 5, an upper frame 6, and a front bar 7 for installing the control box 3, as shown in FIG. 2, and is adapted to house the component members. Two fixing plates 8 are fixedly fitted to the base frame 5 by welding, for example; and the engine 1 and the generator 2 are mounted on the fixing plates 8 via rubber vibration insulators 9.

The engine 1 and the generator 2 are mounted on the frame structure 4 by first installing the engine 1 on a fixing plate 8 via a rubber vibration insulator 9, aligning the rotating shaft of the generator 2 with the output shaft of the engine 1 while adjusting the levels of both, then fixedly fitting the generator 2 to another fixing plate 8 of the base frame 5 via another rubber vibration insulator 9, and then connecting the output shaft and the rotating shaft. The control box 3 is installed on the base frame 5 using the front bar 7, and then the upper frame 6 is installed on the base frame 5.

With the recent progress of miniaturization in voltage regulators for keeping output voltage at a constant level, however, these electronic devices can be installed on the generator 2 proper, eliminating not only the need for a large control box 3 of the conventional type, but also the need for a frame structure 4 of a large size and a complicated construction. Engine-driven generators of the conventional type involving a large number of components have had the problem of requiring much time in assembling such components.

SUMMARY OF THE INVENTION

It is therefore an object of this invention to provide an engine-driven generator that solves the problems inherent in the prior art as mentioned earlier, requires a smaller number of components, and improves assembly efficiency.

To accomplish this objective, this invention provides an engine-drive generator incorporating an engine and a generator in a single unit; the output shaft of the engine and the rotating shaft of the generator connected coaxially, via a frame structure integrally assembling two support members provided in parallel with the axial line of the output shaft and the rotating shaft and two handle members orthogonally intersecting the aforementioned axial line in a projection on a plane via upright members in which base members are fixedly fitted between support members below the engine and the generator in such a manner as to orthogonally intersect the support members, a generator mounting member having a mounting hole in the axial direction provided between a bulged portion integrally formed in such a manner as to protrude from the lower part of a rear bracket of the generator and the base member below the generator, and two engine mounting members provided between the engine and the base member below the engine are disposed at the apexes of a triangle so that the engine and the generator are mounted on the frame structure via the three mounting members.

In accordance with this invention, the generator mounting member can have a bolt hole corresponding to the mounting hole on the upper part thereof, positioning projections on the lower part thereof, and vibration insulating members on the intermediate part thereof.

In accordance with this invention, furthermore, the height of the mounting part of the base member below the generator can be made larger than the height of the mounting part of the base members below the engine, and a plurality of rubber vibration insulators can be proved on the bottom surface of the frame structure.

DETAILED DESCRIPTION OF THE EMBODIMENTS

Figure 1:
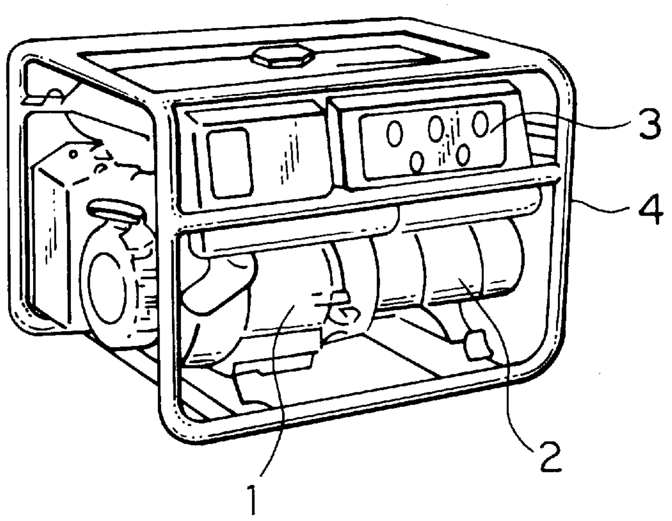
FIG. 1 (PRIOR ART)
FIG. 1 is a perspective view showing an example of an engine-driven generator of the conventional type.
Figure 2:
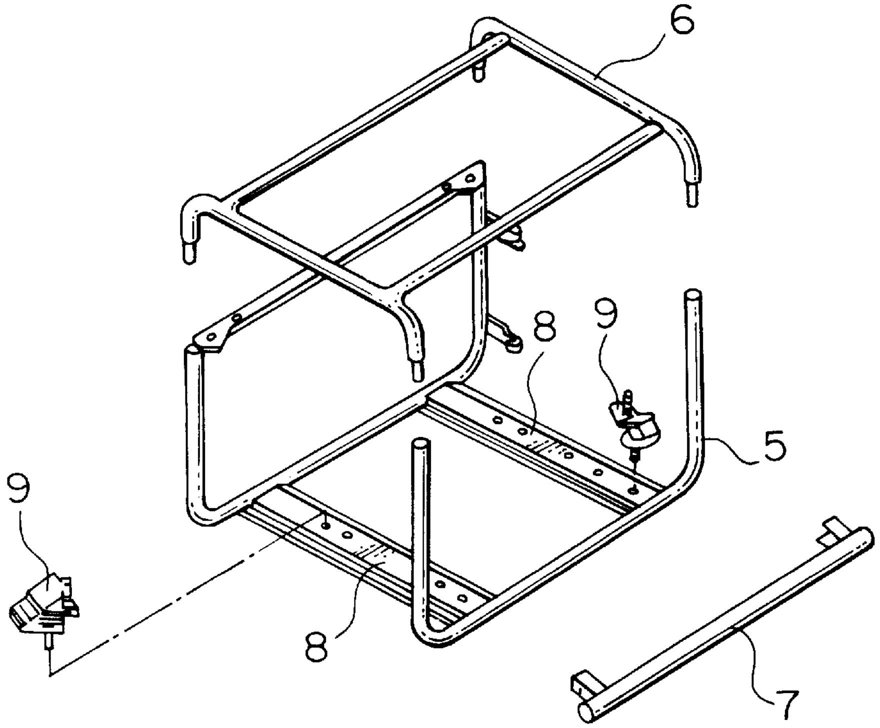
FIG. 2 (PRIOR ART)
FIG. 2 is an exploded perspective view of the frame structure shown in FIG. 1.
Figure 3:
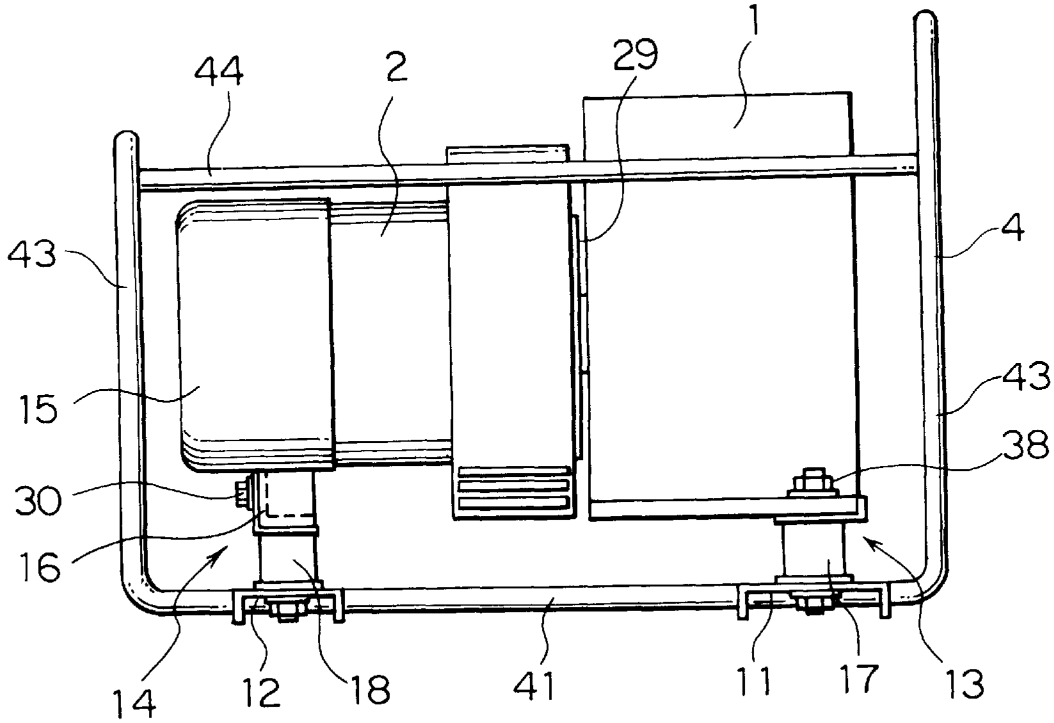
FIGS. 3 and 4 are a front view and a left side view, respectively, illustrating an embodiment of this invention.
Figure 4:
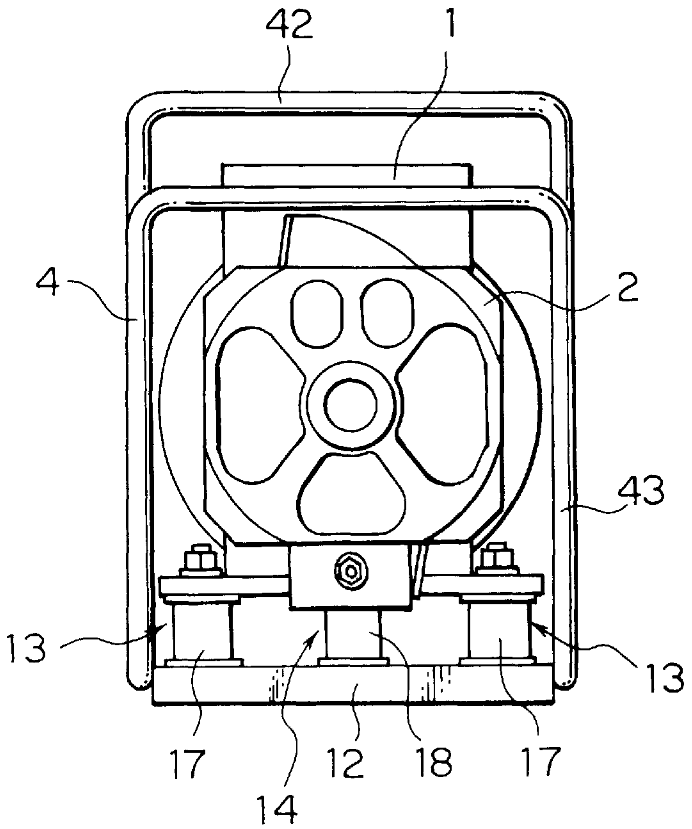
Figure 5:
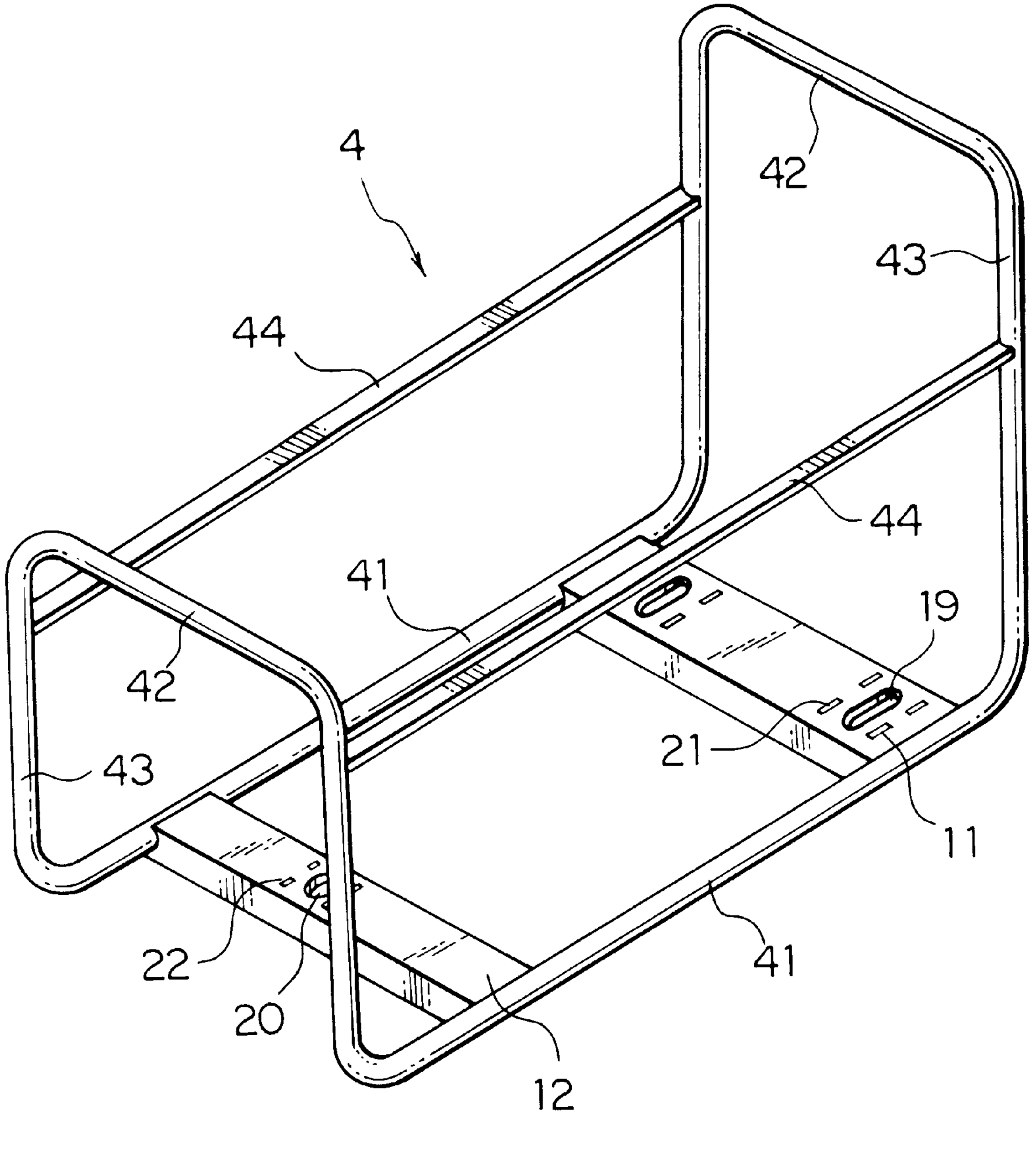
FIG. 5 is a perspective view illustrating the frame structure shown in FIGS. 3 and 4.

FIGS. 3 and 4 are a front view and a left side view, respectively, illustrating an embodiment of this invention, and FIG. 5 is a perspective view illustrating the frame structure shown in FIGS. 3 and 4. Like parts are indicated by like reference numerals in FIGS. 1 and 2. In FIGS. 3 through 5, a frame structure 4 comprises two support members 41 provided in parallel with the axial line of the output shaft of an engine 1 and the rotating shaft of a generator 2, and two handle members 42 orthogonally intersecting the axial line when projected on a plane, both integrally formed via upright members 43. Numeral 44 denotes side beams installed on the upright members 43 via screws, for example, after the engine 1 and the generator 2 have been mounted on the frame structure 4, as will be described later.

Numerals 11 and 12 denote base members, made of steel channels, for example, fixedly fitted between the support members 41 and 41 below the engine 1 and the generator 2 by welding means, for example, in such a manner as to orthogonally intersecting the support members 41 and 41. Numerals 13 and 14 denote engine mounting members and a generator mounting member, respectively; two engine mounting members 13 provided between the engine 1 and a rear bracket 15 below the engine 1, and a generator mounting member 14 provided between a bulged portion 16 formed on the lower part of the rear bracket 15 of the generator 2 and a base member 12 below the generator 2.

The engine mounting members 13 and the generator mounting member 14 are disposed at the apexes of a triangle, and the vibration insulating members 17 and 18 formed in such a manner as will be described later arc provided, and the engine 1 and the generator 2 are mounted on the frame structure 4. Numerals 19 and 20 denote bolt holes, 21 and 22 positioning holes, both provided on the base members 11 and 12.

Figure 6A:
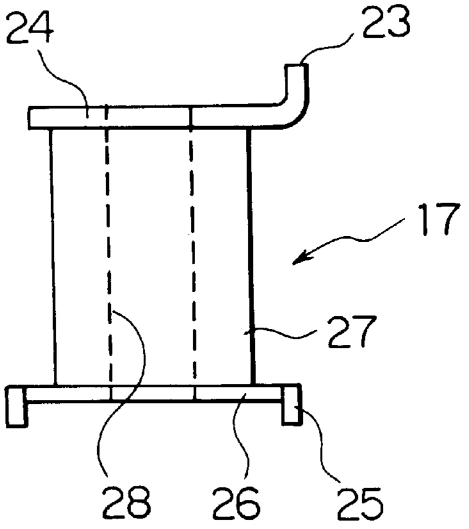
FIGS. 6A and 6B are a front view and a left side view, respectively, of the vibration insulating member 17 shown in FIGS. 3 and 4.
Figure 6B:
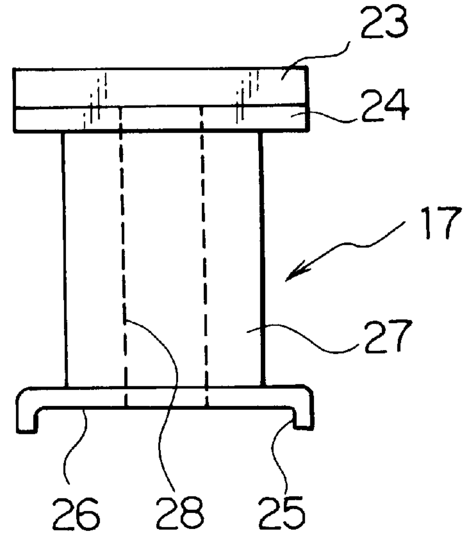

FIGS. 6A and 6B are a front view and a left side view illustrating the vibration insulating member 17 shown in FIGS. 3 and 4. In FIGS. 6A and 6B, the vibration insulating member 17 is formed by integrally joining together an upper plate 24 having an L-shaped stopper 23 made of a steel plate, for example, a lower plate 26 having projections 25, and a vibration insulator 27 made of rubber interposed between the upper and lower plates 24 and 26. Numeral 28 denotes a bolt hole provided in such a manner as to vertically pass through the vibration insulating members 17, the upper plate 24 and the lower plate 26.

Figure 7A:
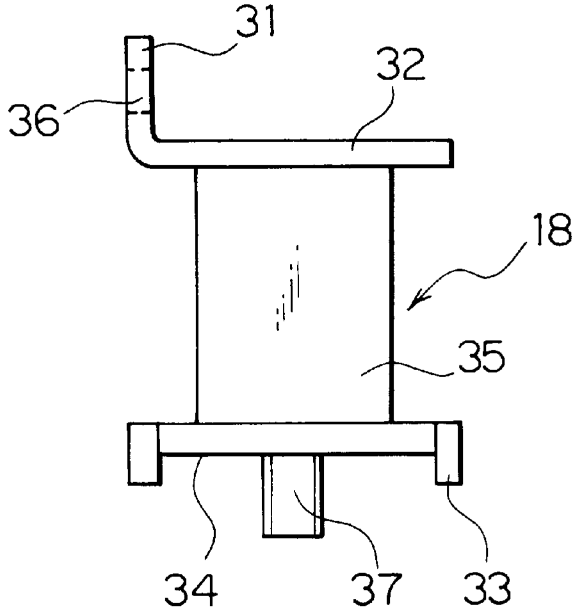
FIGS. 7A and 7B are a front view and a left side view, respectively, of the vibration insulating member 18 shown in FIGS. 3 and 4.
Figure 7B:
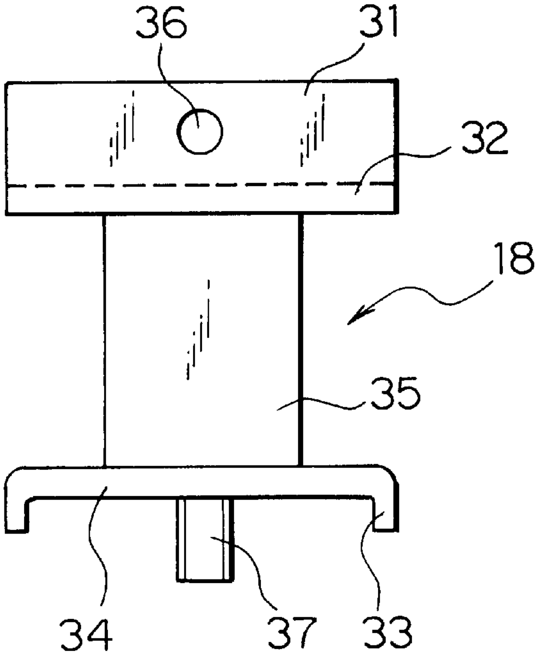

FIGS. 7A and 7B are a front view and a left side view of the vibration insulating member 18 shown in FIGS. 3 and 4. In FIGS. 7A and 7B, the vibration insulating member 18 is formed by integrally joining together an upper plate 32 having an L-shaped stopper 31 made of a steel plate, for example, a lower plate 34 having projections 33, and a vibration insulator 35 made of rubber and formed into a solid cylindrical shape, for example, interposed between the upper and lower plates 32 and 34. Numeral 36 denotes a bolt hole provided on the stopper 31. Numeral 37 denotes a mounting bolt protruded from the lower part of the lower plate 34.

To assemble an engine-driven generator having the aforementioned construction, the vibration insulating member 18 is fixed in position on the base member 12 via the projections 33 and the positioning holes 22, while the vibration insulating members 17 are temporarily held in position on the base member 11 via the projections 25 and the positioning holes 21. Next, the front bracket 29 is fixedly fitted to the engine 1, and then the generator 2 is positioned that the rotating shaft thereof is aligned with the output shaft of the engine 1, the bulged portion 16 is disposed on the vibration insulating member 18, and the output shaft and the rotating shaft are connected directly with each other via through bolts (not shown).

After the engine 1 and the generator 2 have been connected, the bulged portion 16 of the generator 2 is forced onto the stopper 31 of the upper plate 32 constituting the vibration insulating member 18, and the generator 2 is fixedly fitted on the vibration insulating member 18 via the mounting bolts 30. Next, the vibration insulating members 17 are moved leftward in FIG. 3, and the stoppers 23 of the upper plates 24 constituting the vibration insulating members 17 are forced onto the engine 1. The assembly of the engine-driven generator is completed by fixing the vibration insulating members 17 by fastening the nuts 38.

The aforementioned positioning can be accomplished smoothly without any trouble since the bolt holes 19 and the positioning holes 21 provided on the base member 11 are slotted holes extended in the direction along the output shaft of the engine 1 and the rotating shaft of the generator 2. In addition, the bolt hole 20 and the positioning holes 22 may also be formed into similar slotted holes.

Figure 8:
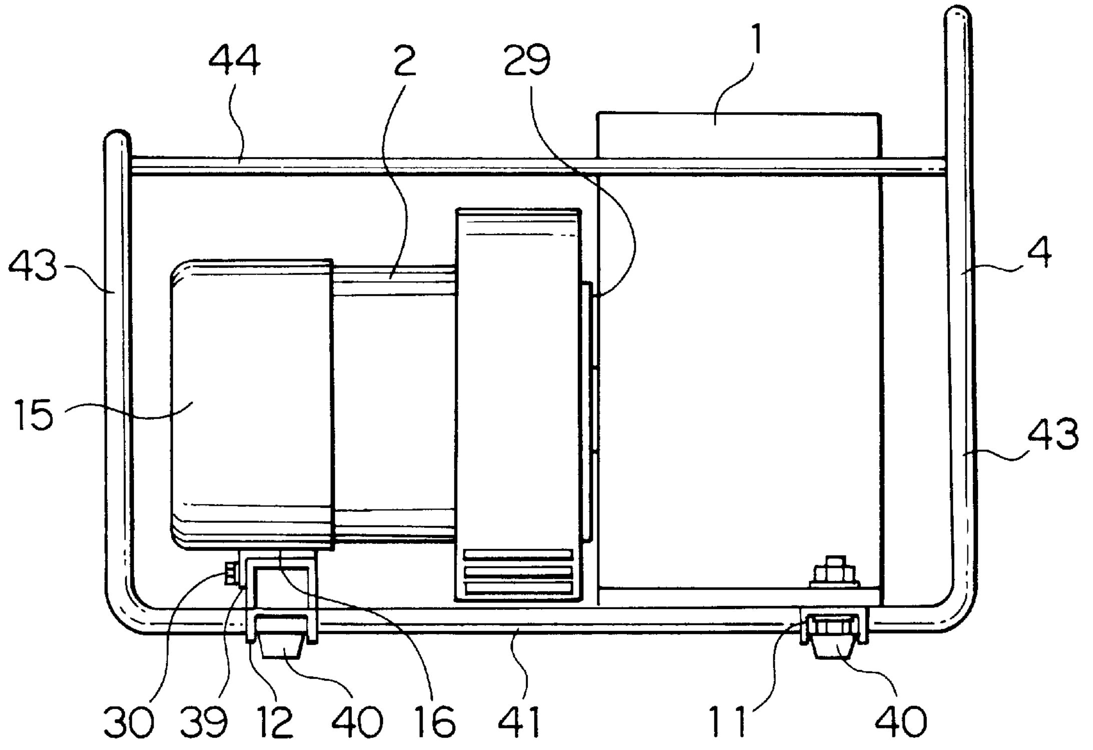
FIG. 8 is a front view illustrating another embodiment of this invention.
Figure 9A:
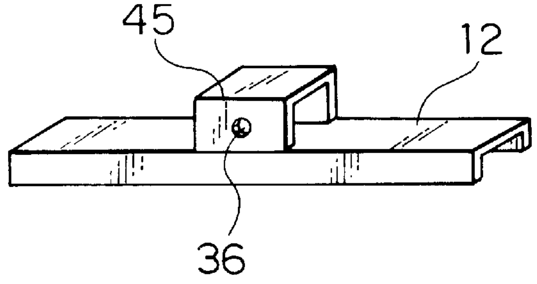
FIGS. 9A and 9B are perspective views illustrating the base members 12 shown in FIG. 8.
Figure 9B:
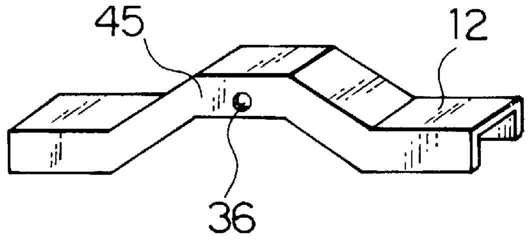
Figure 10:
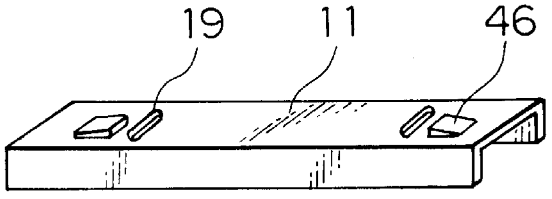
FIG. 10 is a perspective view illustrating the base member 11 shown in FIG. 8.

FIG. 8 is a front view illustrating another embodiment of this invention, FIGS. 9 and 10 are perspective views illustrating the base members 11 and 12 shown in FIG. 8. Like parts are indicated by like reference numerals used in FIGS. 3 through 5. In FIGS. 8 through 10, a rear bracket 15 has on the lower part thereof a vertical bulged portion 39, as shown in FIG. 8. Numeral 40 denotes rubber vibration insulators made of rubber fitted on the bottom surface of the support members 41 constituting the frame structure 4 via fastening screws, for example.

Next, the base member 12 is made of a steel channel, for example, as shown in FIG. 9A, for example, and has in the middle thereof a height-adjusting support mount 45 integrally provided by welding, for example. The support mount 45 may be integrally provided with the base member 12 by forming the base member 12 into a trapezoidal shape, as shown in FIG. 9B. On the base member 11, on the other hand, provided are two projections 46 for positioning the engine 1.

Assembly procedures for the engine-driven generator of the aforementioned construction are almost the same as those for the engine-driven generator shown in FIGS. 3 and 4, except that the engine 1 and the generator 2 are mounted directly on the base members 11 and 12 in the embodiment shown in FIGS. 8 through 10. In this case, vibrations produced by the engine 1 and the generator 2 are absorbed by the rubber vibration insulators 40 provided on the bottom surface of the frame structure 4.

This invention having the aforementioned construction and operation can achieve the following beneficial effects.

(1) The generator can be easily assembled since the rear bracket and the mounting members of the generator are fixed from the axial direction.

(2) That a small number of component parts are required for the engine-driven generator of this invention makes parts control and assembly operation easy, leading to reduced manufacturing cost.

(3) That the mounting members are fitted to the base members of the engine and generator at three points helps stabilize the joint between the engine and generator and the frame structure.

(4) The construction in which the engine and generator are assembled integrally onto the frame structure contributes to improved operability even in a working environment involving frequent transport and handling.

What is claimed is:

1. An engine-driven generator comprising an engine and a generator, with the output shaft of said engine and the rotating shaft of said generator connected coaxially, incorporated into a single unit via a frame structure structured by integrally forming two support members provided in parallel with the axial line of said output shaft and said rotating shaft with two handle members orthogonally intersecting said axial line in a projection on a plane via upright members, characterized in that base members are fixedly fitted to said support members below said engine and said generator in such a manner as to orthogonally intersecting said support members, a generator mounting member having a mounting hole in the axial direction provided between a bulged portion integrally protruding on the lower part of a rear bracket of said generator and said base member below said generator, and two engine mounting members provided between said engine and said base member below said engine are disposed on the apexes of a triangle, and said engine and said generator are mounted on said frame structure via said three mounting members.

2. An engine-driven generator as set forth in claim 1 wherein a plurality of positioning holes are provided on said base members, and projections provided on the lower part of said mounting members are engaged with said positioning holes.

3. An engine-driven generator as set forth in claim 1 wherein said generator mounting member comprises an upper plate having on an L-shaped stopper a mounting hole in the direction parallel to the rotating shaft of said generator, a lower plate having projections for engaging with positioning holes provided on said base member, and a vibration insulating member integrally joined between said upper plate and said lower plate.

4. An engine-driven generator as set forth in claim 1 wherein the height of the mounting portion of said base member below said generator is made larger than the height of the mounting portion of said base member below said engine, and a plurality of rubber vibration insulators are provided on the bottom surface of said frame structure.

5. An engine-driven generator as set forth in claim 4 wherein said base members are made of steel channels, a support mount is integrally fitted in the middle of said base member below said generator, a mounting hole is provided on said support mount in the direction parallel to the rotating shaft of said generator, and positioning projections are provided on the top surface of said base member below said engine.

6. An engine-driven generator as set forth in claim 4 wherein said base members are made of steel channels, said base member below said generator is formed into a trapezoidal shape, a mounting hole is provided in the middle of said base member in the direction parallel to the rotating shaft of said generator, and positioning projections are provided on the top surface of said base member below said engine.

* * * * *